Patented Feb. 9, 1932

1,844,712

UNITED STATES PATENT OFFICE

CHARLES E. ALLEN, OF ROCHESTER, NEW YORK, ASSIGNOR TO EASTMAN KODAK COMPANY, OF ROCHESTER, NEW YORK, A CORPORATION OF NEW YORK

PROCESS FOR RECLAIMING FILM SCRAP, ETC., INCLUDING BLEACHING

No Drawing.   Application filed May 24, 1930.   Serial No. 455,449.

This invention relates to the reclamation of photographic film scrap or the like and more particularly to such a reclamation process which includes the bleaching of the film scrap or other dyed cellulose derivative scrap.

Photographic film scrap is valuable in that it may be reclaimed for certain purposes, such as the production of new film, lacquers, fabric coatings and the like. Dyed artificial silk composed of a cellulose derivative may also be so reclaimed. It is customary in such reclamation processes to first remove the silver halide emulsion coating from the film by hot water treatment then bleach the film in order to convert any color present into a more soluble form and to then leach the thus bleached scrap with a solution which is a solvent for the bleached dye or other foreign matter to be removed.

This bleaching step involves the treatment of the film scrap at temperatures of from approximately 60° F. to 90° F. for a suitable period of from approximately 45 minutes to as much as 5 or 6 hours with a suitable solution of a sodium or calcium hypochlorite. The bleaching action of such a solution can, however, be hastened by the acidification of the hypochlorite solution in order to make available free chlorine for the production of hypochlorous acid which does the bleaching. It is, however, detrimental to the film to acidify the hypochlorite solution too strongly; also, such over-acidification will release chlorine too rapidly and cause waste thereof and danger to workmen engaged in carrying out the process.

I have found that the free chlorine from such hypochlorite bleaching solutions may be liberated in quite suitable quantities by a very simple process, namely, by bubbling carbon dioxide through the bleaching solution in which is dispersed the scrap. This produces in the solution, carbonic acid, which, in turn reacts with the hypochlorite to release just sufficient chlorine to carry on the bleaching action in the proper proportions. Furthermore, the introduction of the carbon dioxide into the hypochlorite solution can be quite readily controlled so that no waste of materials will result, nor detrimental working conditions arise.

It is therefore, among the objects of my invention to provide a process of bleaching dyed cellulose derivatives. It is a further object to improve bleaching processes by a more controlled liberation of active bleaching elements in the bleach. Other objects will be apparent herein.

As an example of the manner in which my invention may be carried out, 50 lbs. of calcium hypochlorite are dissolved in approximately 250 gallons of water to which approximately 17 lbs. of sodium carbonate is then added and, after thorough stirring, allowed to settle. This produces a solution of both calcium and sodium hypochlorites, the function of the sodium carbonate addition being to form a flocculent precipitate of calcium carbonate which clarifies the solution when it settles. The clear liquid is then siphoned off, adjusted in concentration to an available chlorine content of between .1 and .5% and a quantity of scrap base of silk scrap then added to the solution and agitated for approximately 45 minutes to 1½ hours. Into this solution or suspension is slowly bubbled approximately 3 lbs. of carbon dioxide, the addition of the carbon dioxide being so timed as to be completely added during the bleaching process.

The film is then washed with water until all free chlorine is removed and it is then subjected to the usual leaching treatment with an alcohol mixture for the removal of the bleached dye, chlorides and other undesirable compounds. The alcohol leach may consist of 80% methyl and 20% butyl alcohol or ethyl alcohol with possibly a small addition of water may be employed.

Various modifications in the manner of carrying out my invention may be employed, and the washing and leaching steps may be varied as known to those skilled in the art. The principle of my invention will, however, stand out as an economical and easily controlled method of hastening the bleaching action which otherwise is slow and tedious, or which, if hastened with the usual mineral acids, becomes dangerous.

Having thus described my invention, what I claim as new and desire to secure by Letters Patent of the United States is:

1. The process of bleaching cellulose derivative scrap which comprises treating the scrap with a solution of an alkaline hypochlorite through which is bubbled carbon dioxide.

2. The process of bleaching photographic film scrap which comprises treating the scrap with a solution of an alkaline hypochlorite through which is bubbled carbon dioxide.

3. The process of bleaching photographic film scrap base which comprises treating the film scrap base with an aqueous solution of an alkaline hypochlorite through which is bubbled carbon dioxide.

Signed at Rochester, New York, this 20th day of May, 1930.

CHARLES E. ALLEN.